C. REBSTOCK & J. OTTNER.

Mold for Casting Knobs.

No. 5,444.

Reissued June 10, 1873.

Witnesses:

A Bennekendorf.

C Sidquick

Inventor:

C. Rebstock

J. Ottner

PER

Attorneys.

AM. PHOTO-LITHOGRAPHIC CO. N.Y. (OSBORNE'S PROCESS.)

UNITED STATES PATENT OFFICE.

CHRISTIAN REBSTOCK AND JOSEPH OTTNER, OF BRIDGEPORT, CONNECTICUT, ASSIGNORS, BY MESNE ASSIGNMENTS, TO THE BRIDGEPORT ELECTRO CASTING COMPANY.

IMPROVEMENT IN MOLDS FOR CASTING KNOBS.

Specification forming part of Letters Patent No. 134,931, dated January 14, 1873; reissue No. 5,444, dated June 10, 1873; application filed March 22, 1873.

DIVISION A.

*To all whom it may concern:*

Be it known that we, CHRISTIAN REBSTOCK and JOSEPH OTTNER, of Bridgeport, in the county of Fairfield and State of Connecticut, have invented a new and Improved Mold for Casting Metal Knobs, of which the following is a specification:

The object of our invention is to improve the means for casting metallic door and other knobs, whether such knobs are ornamented or made plain on the face; and it consists in a mold so constructed that the fused metal is cast between an outer metallic shell placed into the mold and corresponding in shape therewith, and an inner metallic shell, strengthening thereby the body of the knobs and dispensing with the removal of the inner core; it consists further in providing for a hard-metal tube for bushing the spindle-hole in the knob-shank, and for a hard-metal eyelet in the same for the shank-screw, the construction being as hereinafter described.

Figure 1:
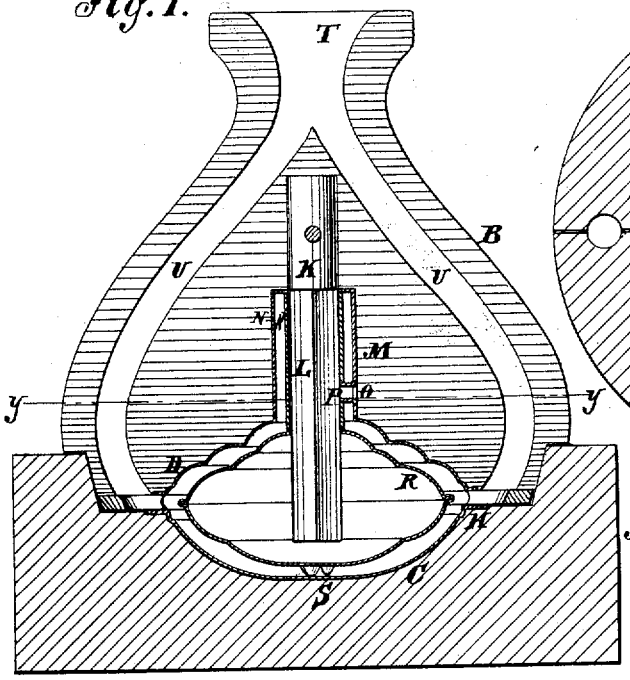
Figure 2:
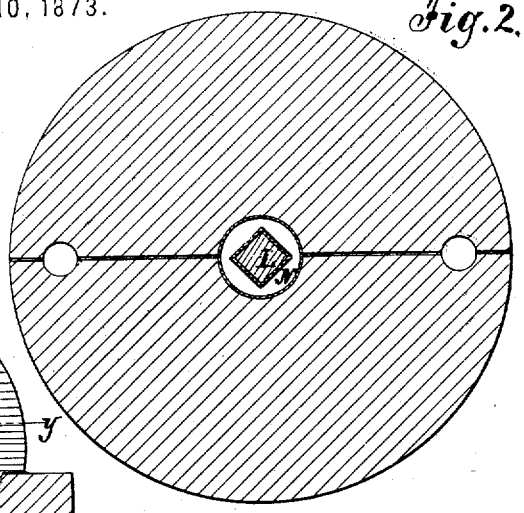
Figure 3:
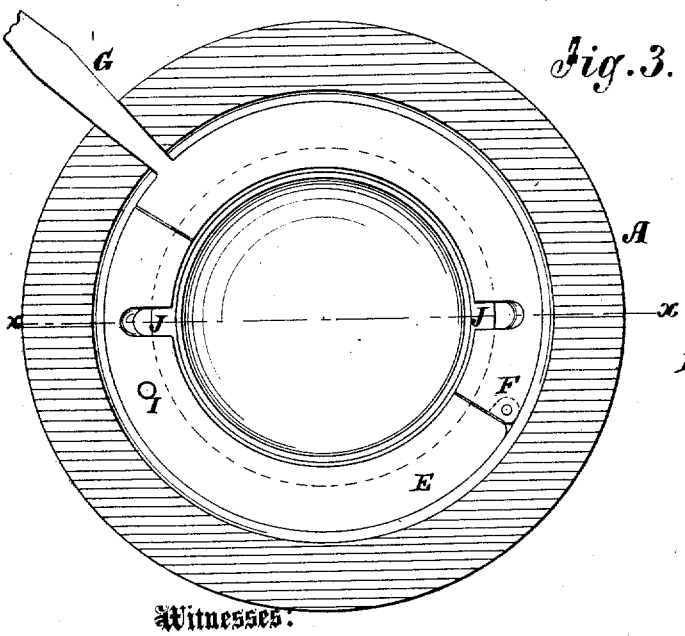
Figure 4:
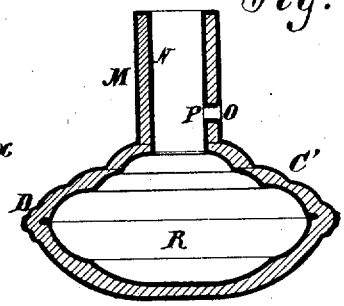

In the accompanying drawing, Figure 1 is a longitudinal section taken on the line *x x* of Fig. 3. Fig. 2 is a cross-section on the line *y y* of Fig. 1. Fig. 3 is a top view with the upper part of the mold removed; and Fig. 4 is a section of a knob cast in our improved mold.

Similar letters of reference indicate corresponding parts.

In the drawing, A represents the lower or bed portion of the mold. B is the upper part of the same, made in sections divided vertically and doweled together. The gate-passages U are formed by these parts, as indicated in Fig. 2, and the melted metal is conveyed by them to the bed-part A of the mold. There may be more or less of these gates, as may be desired. T is the entrance part or sprue through which the metal is poured. C represents the recess in the lower mold in accordance with the form of the knob to be cast. D is the outer shell of the knob, of suitable sheet metal, struck up or swaged in two parts. The face-part of the shell D fits exactly into recess C of bed A, the upper part into a similarly corresponding recess of mold B, as seen in Fig. 1. E is an adjustable ring interposed between the parts A and B of the mold, and embracing the shells in line with the space between the upper and lower parts. This ring is jointed, as seen at F, and has a handle, G, by means of which it is properly adjusted in the lower part of the mold and on the projecting flange H of the lower shell D, and also on the guiding-pin I. Guide-recesses J of ring E, corresponding with gate-passages U, admit the melted metal into the interior of shell *d*. K represents the knob-spindles. L is an extension of the spindle K, and is square or prismatic in cross-section, to adapt it to fit exactly in the hollow prism N, which forms, in connection with an inner shell, R, the core of the knob. Shell R is struck up of suitable sheet-metal, in two parts, with the edges clasped together so as to form a single piece. On the bottom of the inner shell R are one or more projections or teats, S, made by punching from the inside, by which the inner shell R is kept separated from the outer shell D, and the thickness of the cast-metal part between the shells regulated. O is a cylindrical eyelet of hard metal of the upper mold, corresponding with suitable apertures in the shells, and serves to bush the hole P for the admission of the fastening-screw of the knob-shank. The spindle K passes through prism N to the interior of shell R till its upper cylindrical part rests on the shank M of shell D. The knobs may then be cast and the melted metal will fill up the space between the shells.

Knobs of the most durable character may be made with an outside surface of any firm metal, as silver, nickel, or fine brass, while the interior shell and the material of the knobs may be of cheaper metal. By means of the hollow-shell they are light weight, being still handsome, durable, and strong.

The upper and lower parts of shells may be flanged to partly overlap ring E, as seen in Fig. 1.

Having thus described our invention, we claim as new and desire to secure by Letters Patent—

1. A mold for casting knobs adapted for the reception of an outer shell, D, and of a spindle, K, projecting from the inner shell R, substantially as described.

2. A mold for casting knobs, so constructed that a bushing-tube around the spindle and an eyelet for bushing the fastening screw-hole may be set, substantially as shown and described.

3. In combination with a mold for casting knobs, the adjustable ring E, substantially as and for the purpose described.

CHRISTIAN REBSTOCK.

JOSEPH OTTNER.

Witnesses:
HERMANN GAUSS,
EDWARD H. LYON.